United States Patent [19]

Ono et al.

[11] Patent Number: 5,508,358
[45] Date of Patent: Apr. 16, 1996

[54] POLYESTER-SILICONE COPOLYMER AND COATING COMPOSITION USING THE SAME

[75] Inventors: Ichiro Ono; Shinji Miyadai, both of Gunma, Japan

[73] Assignee: Shin-Etsu Chemical Co., Inc., Tokyo, Japan

[21] Appl. No.: 378,571

[22] Filed: Jan. 26, 1995

[30] Foreign Application Priority Data

Jan. 27, 1994 [JP] Japan ..................................... 6-024726

[51] Int. Cl.$^6$ ..................................................... C08F 20/00
[52] U.S. Cl. ........................... 525/446; 525/454; 525/464; 528/26
[58] Field of Search ..................................... 525/446, 464, 525/454; 528/26

[56] References Cited

U.S. PATENT DOCUMENTS

| | | | |
|---|---|---|---|
| 4,894,427 | 1/1990 | Yamamoto et al. | 525/446 |
| 5,084,527 | 1/1992 | Yamamoto et al. | 525/446 |
| 5,191,036 | 3/1993 | Yamamoto et al. | 525/446 |

*Primary Examiner*—Melvyn I. Marquis
*Attorney, Agent, or Firm*—Millen, White, Zelano & Branigan

[57] ABSTRACT

Disclosed are a polyester-silicone copolymer which comprises a polyester part containing naphthalene rings and a dimethylpolysiloxane part and has a glass transition temperature of at least 60° C., and a coating composition containing as a main component the aforesaid polyester-silicone copolymer.

10 Claims, No Drawings

POLYESTER-SILICONE COPOLYMER AND COATING COMPOSITION USING THE SAME

FIELD OF THE INVENTION

This invention relates to a novel polyester-silicone copolymer, and more specifically to a polyester-silicone copolymer having not only excellent heat-resistance characteristics but also high water repellency, excellent mold-releasing properties, excellent sliding properties and excellent molding properties, and a coating composition using the aforesaid polyester silicone copolymer.

BACKGROUND OF THE INVENTION

Aromatic polyester resins such as polyethyleneterephthalate (PET) and polybutyleneterephthalate (PBT) have a wide variety of applications in the manufacture of molded goods, films, fibers and paints due to their excellent heat resistance, dimensional stability and mechanical properties.

Conventionally, the addition of silicones to these aromatic polyester resins had been considered in order to confer special properties such as mold-releasing properties, sliding properties and water repellency.

However, when dimethylsilicone oils were added to those polyester resins, although these oils had particularly good mold release and other properties, the resins often became cloudy or their surface properties were impaired due to the fact that the silicone and the resin had poor compatibility.

In order to remedy this defect, silicone compounds having improved compatibility with organic resins including polyester resins, obtained by modifying the compounds with phenyl groups, long chain alkyl groups or polyoxyalkylene groups, have been proposed (Japanese Tokko Sho 58-50064, Japanese Tokkai Sho 56-41256 and Japanese Tokko Hei 2-55459). However, although these silicone confounds have good compatibility with polyester resins, the retention of their properties, including mold-releasing properties, sliding properties and water repellency, was poor when they were added to the polyester resins.

Attempts have been made to improve the retention of these properties by adding reactive silicone oils having a group, such as —NCO, —COOH or an epoxy group, which reacts with the hydroxyl groups of the polyester resin. However, as the reaction requires the use of a catalyst or heat, the range of application of this method is limited.

Recently, studies have been performed on polyester-silicone copolymers consisting of a polyester and a silicone (Japanese Tokkai Hei 3-231812s Japanese Tokkai Hei 4-122726).

In those cases, although the aforementioned retention of properties is improved, the glass transition temperature of such a copolymer is very low, and this causes the loss of the inherent heat properties of the polyester resin.

As a result of intensive studies aimed at overcoming the aforementioned drawbacks, the inventors have discovered that when a polyester part which contains naphthalene rings is incorporated in a polyester-silicone copolymer the resulting copolymer can have a glass transition point raised up to at least 60° C., and thereby the copolymer not only can retain the heat resistance of the polyester resin but also can possess various properties attributable to the silicone, including mold-releasing properties, sliding properties and water repellency, and these properties can be well retained over a period of time. These discoveries have led the inventors to formulate the present invention.

SUMMARY OF THE INVENTION

It is therefore a first object of this invention to provide a polyester-silicone copolymer having not only excellent heat-resistance characteristics but also high water repellency, excellent mold-releasing properties, excellent sliding properties and excellent molding properties.

It is a second object of this invention to provide a coating composition suitable for applications where heat resistance, water repellency, mold-releasing properties and sliding properties are required.

The aforesaid objects of the invention are attained by a polyester silicone copolymer which comprises a polyester part containing naphthalene rings and a dimethylpolysiloxane part and has a glass transition temperature of at least 60° C., and by a coating composition using this copolymer.

In accordance with the present invention, the polyester-silicone copolymer can have a glass transition temperature of at least 60° C. although it is a copolymer of dimethylpolysiloxane, and so it has not only high heat resistance but also high water repellency, excellent mold-releasing properties, excellent sliding properties and excellent molding properties.

The polyester silicone copolymer of this invention, therefore, has a wide variety of applications, for example, in various types of molded products, as a coating on the reverse side of a heat-sensitive transfer sheet or as an imaging layer on recording paper in thermosensitive recording, as a magnetic layer on magnetic tape, and as an easy-to-clean, heat-resistant material in microwave ovens, electric ovens or frying pans.

DETAILED DESCRIPTION OF THE INVENTION

The polyester part of the copolymer of this invention is obtained by the polycondensation reaction of a polycarboxylic acid and/or a derivative thereof with a polyhydric alcohol, and characterized in that its skeleton contains naphthalene rings. This polyester part can be easily synthesized by using a polycarboxylic acid containing a naphthalene ring and/or a derivative thereof.

As for the present polycarboxylic acid and/or the derivative thereof, it is particularly desirable to use a naphthalene dicarboxylic acid and/or a derivative thereof represented by the following formula [I]:

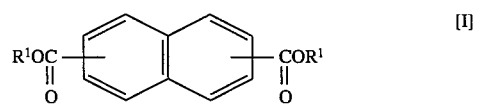

In this formula, $R^1$ is a hydrogen atom or a hydrocarbon group containing 1–4 carbon atoms.

Specific examples of the naphthalene dicarboxylic acid and/or derivative are the compounds illustrated below:

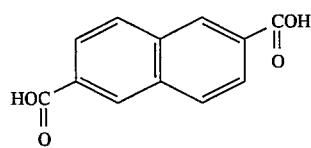

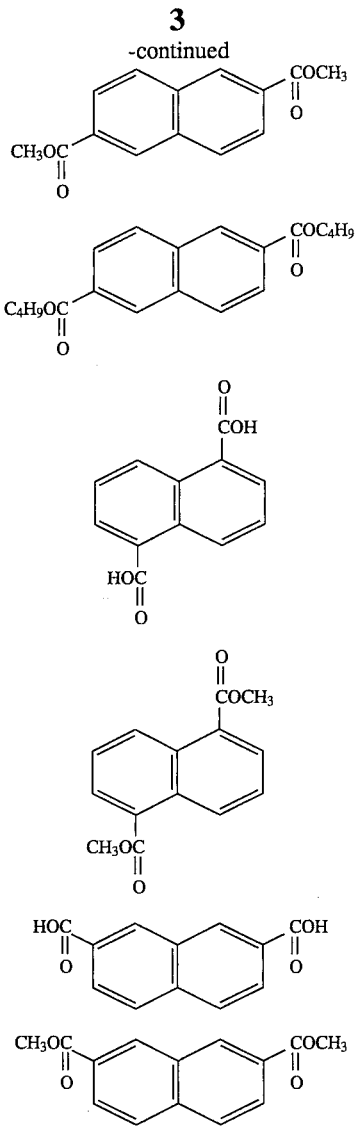

The polycarboxylic acid and/or derivative used to synthesize the polyester part of the polyester silicone copolymer of this invention preferably comprises at least 20 mole %, and more preferably at least 30 mole %, of a naphthalene dicarboxylic acid and/or a derivative thereof. If the proportion is less than 20 mole %, the glass transition temperature of the polyester silicone copolymer which is finally obtained is low, and its heat resistance deteriorates.

Examples of polycarboxylic acids or derivatives, other than the naphthalene dicarboxylic acids or their derivatives, are dicarboxylic acids such as phthalic acid, isophthalic acid, terephthalic acid, maleic acid, fumaric acid, citraconic acid, itaconic acid, succinic acid, adipic acid, sebacic acid, azelaic acid, etc.; dicarboxylic acid anhydrides such as phthalic anhydride, maleic anhydride, etc.; and lower alkyl esters of dicarboxylic acids such as dimethyl terephthalate, dimethyl maleate, dimethyl adipate, etc. Of these acids and their derivatives, it is particularly preferable to mainly use aromatic carboxylic acids, such as phthalic acid, isophthalic acid, terephthalic acid, etc., or derivative thereof.

In addition, 1,2,4-benzenetricarboxylic acid, 2,5,7-naphthalenetricarboxylic acid, their anhydrides or lower alkyl esters may be used in small amounts, so far as they do not cause the formation of a gelled matter.

The polyhydric alcohol used in this invention is preferably a diol such as ethylene glycol, propylene glycol, 1,4-butanediol, 1,3-butanediol, 2,3-butanediol, diethylene glycol, dipropylene glycol, triethylene glycol, 1,5-pentanediol, 1,6-hexanediol, neopentyl glycol, 2,2,4-trimethylpentane-1,3-diol, hydrogenated bisphenol A, 2,2-di(4-hydroxyethoxyphenyl)propane or 2,2-di(4-hydroxypropoxyphenyl)propane.

Also, a triol or tetraol compound such as glycerine, trimethylolethane, trimethylolpropane, pentaerythrytol or the like may be used in such an amount as not to cause the formation of a gellted matter.

The polyester part of the polyester silicone copolymer of this invention may be manufactured by the usual method of polycondensation for manufacturing polyesters, wherein the polycarboxylic acid and/or derivative as cited above is polycondensed with the polyhydric alcohol as cited above in an inert gas atmosphere at a temperature of 150°–300° C. and, if needed, under reduced pressure.

In the manufacture of this polyester, the esterification reaction may be assisted by any of generally used catalysts such as tetrabutyl zirconate, zirconium naphthenate, tetrabutyl titanate, tetraoctyl titanate, tetraphenyltin, dibutyltin dichloride, dibutyltin dilaurate, dibutyltin oxide, zinc acetate, calcium acetate, antimony oxide, stannous oxaiate and so on.

The polyester part according to this invention preferably has a polystyrene equivalent weight average molecular weight as determined by GPC in the range 2,000–100,000. If the weight average molecular weight is less than 2,000, the glass transition point is low, and film-forming properties when the copolymer is used in a coating composition are poor. If on the other hand the weight average molecular weight exceeds 100,000, molding properties are poor and solubility in solvents when the copolymer is used in coating compositions is low.

As for the dimethylpolysiloxane according to this invention, those represented by the following formula [II] are preferable from the viewpoints of mold-releasing, water-repelling and sliding properties:

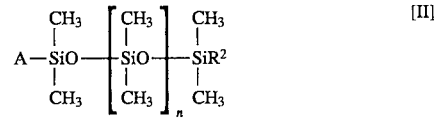

wherein n is a natural number lying in the range 3–100, $R^2$ is a hydrocarbon group having 1–4 carbon atoms, and A is an organic group to which the polyester part is attached.

In particular, it is desirable therein that n is a natural number lying in the range 6–50. If n is less than 3, mold-releasing properties, water repellency and sliding properties are insufficient, while if n is greater than 100, the glass transition temperature of the polyester-silicone copolymer is low and the solubility in a solvent is low when it is used in coating compositions. Specific examples of $R^2$ are methyl, ethyl, n-propyl, isopropyl, n-butyl, isobutyl and tertiary butyl.

The following two methods are typical ways of obtaining the polyester silicone copolymer of this invention.

In the first method, an isocyanate group-containing dimethylpolysiloxane represented by the following formulae [III] and [IV], as disclosed in Japanese Tokkai Hei 4-36325 and Japanese Tokugan Hei 5-43387, is made to react with the hydroxyl group in a polyester.

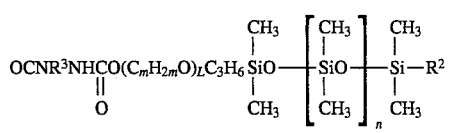

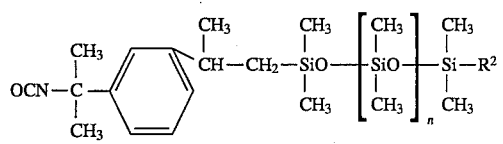

wherein $R^3$ is a divalent organic group, e is a natural number lying in the range 0–50, m is an integer which is 2 or 3, and n and $R^2$ have the same meanings as in the foregoing formula [II], respectively.

In this reaction, it is not always required to use a solvent. However, in view of the facts that the polyester is a solid at ordinary temperature, and that the polyester and the organopolysiloxane containing an isocyanate group are not mutually compatible prior to the reaction, the use of a solvent is desirable in order to render the reaction system homogeneous.

Examples of a solvent which may be used are an ester such as methyl acetate, ethyl acetate, butyl acetate, isopropyl acetate, etc., a ketone such as acetone, MEK, MIBK, diisobutylketone, cyclohexanone, etc., an aromatic hydrocarbon such as benzene, toluene, xylene, etc., and an ether such as diethyl ether, dibutyl ether, tetrahydrofuran, dioxane, etc. These solvents may be used alone or as a mixture of two or more thereof.

In the foregoing reaction, catalysts usually employed in the production of polyurethanes may be used, if desired. Specifically, organotin compounds such as dibutyltin dilaurate, dibutyltin dioctate, tin dioctate, etc.; tertiary amino compounds such as triethylamine, N-ethylmorpholine, N,N,N',N'-tetramethyl-1,3-butanediamine, 1,4-diazabicyclo(2,2,2)octane, 1,8-diazabicyclo(5,4,0)undecene-7, etc.; and so on can be used alone, or two or more of them may be used in admixture.

For these catalysts to enable the reaction to be completed in a short time, the amount of catalyst used preferably lies within the range 0.01–5 weight % and more preferably 0.05–2 weight % relative to the amount of organopolysiloxane containing an isocyanate group. At a reaction temperature of 50°–100° C., a reaction time of 1–20 hours is sufficient.

The second method of preparing this copolymer comprises carrying out copolycondensation by simultaneously using a dimethylpolysiloxane having a functional group able to form two esteric bonds at one end, which is represented by the following formula [V], when the aforesaid polycarboxylic acid and/or its derivative is polycondensed with a polyhydric alcohol:

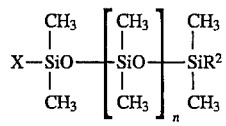

wherein X is a monovalent organic group having a functional group able to form two ester linkages, and n, $R^2$, have the same significance as in the aforesaid formula [2].

There is no particular limitation on X, provided that it has a functional group able to form two ester linkages. Suitable examples of such functional groups are dihydroxyl, dicarboxyl, carboxylic acid anhydride and epoxy groups. The following functional groups, represented by the following formulae [1], [2], [3], [4], [5] and [6], may be cited as preferred examples.

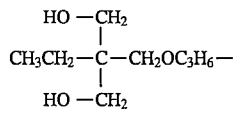

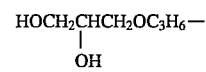

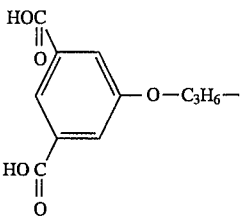

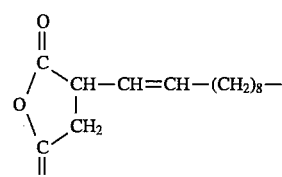

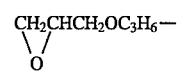

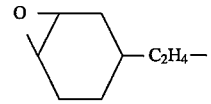

The proportion of the dimethylpolysiloxane component in the polyester-silicone copolymer according to this invention preferably lies in the range 3–50 weight %, but more preferably in the range 5–30 weight %. If this proportion is less than 3 weight %, mold-releasing properties, sliding properties and water repellency are inadequate. If this proportion exceeds 50 weight %, no further improvement of mold-releasing properties, sliding properties and water repellency is gained, and the glass transition temperature of the polyester-silicone copolymer is undesirably low.

Next, the coating composition which contains as a main component the polyester-silicone copolymer according to this invention will be described.

The coating composition according to this invention, in addition to the aforesaid polyester-silicone copolymer, may be blended as desired with solvents, crosslinking agents, other resins, fillers or various types of additives.

Solvents are used to adjust the viscosity or film thickness of the composition, and may be suitably chosen provided that they are compatible with the polyester-silicone copolymer of this invention. Examples of such solvents are aromatic hydrocarbons such as benzene, toluene, xylene, etc.; aliphatic hydrocarbons such as n-hexane, n-octane, n-decane, etc.; chlorine compounds such as methylene chloride, chloroform, carbon tetrachloride, etc.; ketones such as methyl ethyl ketone, methyl isobutyl ketone, dichlorohexanone, etc.; esters such as ethyl acetate, butyl acetate, etc.; dioxane and dimethylformamide. These solvents may be used alone or as a mixture of two or more thereof.

While the polyester-silicone copolymer of this invention gives a satisfactory room-temperature drying paint merely by dissolving it in the aforementioned solvents, a film having excellent solvent-resisting properties can be obtained by blending polyfunctional isocyanate compounds with it as crosslinking agents.

There is no particular limitation on the polyfunctional isocyanate compound used as a crosslinking agent, provided that it can act at least bifunctionally. Examples of such a polyfunctional isocyanate compound are diisocyanates such as tolylenediisocyanate (TDI), diphenylmethanediisocyanate (MDI), tolidine diisocyanate (TODI), naphthalene diisocyanate (NDI), hexamethylene diisocyanate (HDI), isophorone diisocyanate (IPDI), xylene diisocyanate (XDI), etc.; and polyisocyanates such as trimethylolpropane(TMP)-modified TDI, isocyanurate-bonded TDI, TMP-modified HDI, isocyanurate-bonded HDI, Biuret-bonded HDI, TMP-modified IPDI, isocyanurate-bonded IPDI, etc.

The blending proportion of such an isocyanate compound preferably lies in the range of 0.5–2.0 equivalents, but more preferably in the range of 0.8–1.5 equivalents, per hydroxyl group equivalent of the polyester-silicone copolymer according to this invention. In this case, a small amount of an organotin compound such as dibutyltin dioctate, tin dioctate or dibutyltin dilaurate may also be added as a crosslinking agent to promote the crosslinking reaction.

The polyester-silicone copolymer of this invention is the principal component of the coating composition of the invention, but it may be blended with other organic resins such as acryl resins, polyester resins, epoxy resins, alkyd resins, phenol resins, urethane resins, urea resins, melamine resins and so on.

Inorganic fillers, such as silica, alumina, glass powder, clay, talc, calcium carbonate, mica powder, titanium dioxide, wollastonite, magnesium hydroxide, etc., may also blended in order to improve the strength of the film, and other additives, e.g., antioxidants, age resistors, antistatic agents or coloring agents may further be used.

This invention will now be described in further detail with reference to the following examples, but it should be understood that the invention is not to be construed as being limited by these examples in any way.

Synthesis Example 1: Polyester Containing Naphthalene Rings

In a 1 liter glass flask equipped with a stirrer, a thermometer, a condenser, an ester adapter and a pressure reducer, 73.2 g (0.3 mole) of dimethyl 2,6-naphthalenedicarboxylate, 135.8 g (0.7 mole) of dimethyl terephthalate, 206.4 g (0.6 mole) of 2,2-di(4-hydroxypropoxyphenyl)propane, 124.0 g (2.0 mole) of ethylene glycol and 0.27 g of tetrabutyl titanate were placed. The flask was heated on a mantle heater under a current of nitrogen, and the reaction to remove methanol was carried out at 160°–170° C. for 6 hours. The amount of methanol distilled off in the ester adapter was 62.1 g.

Next, after raising the temperature to 220° C. over a period of 1 hour, the reaction to remove ethylene glycol was carried out at 220°– 240° C. at a reduced pressure of 20 mmHg for 3 hours. The amount of ethylene glycol distilled off was 84.2 g. After the reaction was complete, the polymer obtained was cooled to room temperature to give 355.6 g of a light brown transparent solid. The polystyrene equivalent weight average molecular weight determined by GPC (which stands for Gel Permeation Chromatography) was 15,400, the glass transition temperature measured with DSC (a differential scanning calorimeter) was 76° C., and the softening point determined by the ring and ball method was 121° C. The hydroxyl value (JIS K0070) was 23.5 mg KOH/g.

Further, the monomer composition was analyzed by alkaline hydrolysis. Thereby, the polyester obtained was found to consist of the polycarboxylic acids having therebetween the molar ratio as shown in the following formula [7] and the polyhydric alcohols having therebetween the molar ratio as shown in the following formula [8];

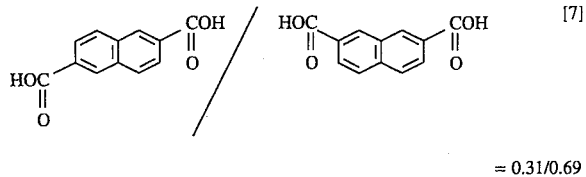

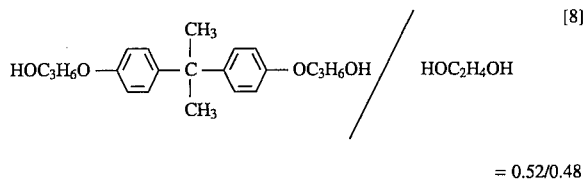

Synthesis Example 2: Another Polyester Containing Naphthalene Rings

The synthesis method used herein was the same as adopted in Synthesis Example 1, except that the amount of dimethyl 2,6-naphthalene dicarboxylate was changed to 244.0 g (1.0 mole) and no dimethylterephtha late was used. In this synthesis, 61.5 g of methanol and 65.8 g of diethylene glycol were distilled off and 361.4 g of a light brown transparent solid was obtained. The weight average molecular weight of the polyester was 8,520, the glass transition temperature was 85° C., the softening point was 128 ° C., and the hydroxyl value was 32.7 mg KOH/g.

The monomer composition was found to consist of the polycarboxylic acid having the molar ratio as shown in the following formula [9], and the polyhydric alcohols having therebetween the molar ratio as shown in the following formula [10];

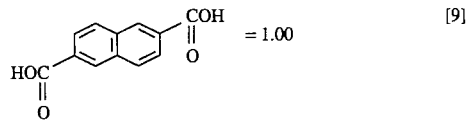

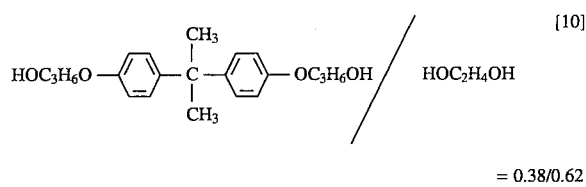

EXAMPLE 1

The same method as in Synthesis Example 1 was used, except that an epoxy group-containing dimethylpolysiloxane as shown by the formula [11] below was further added in an amount of 111.4 g (0.12 mole).

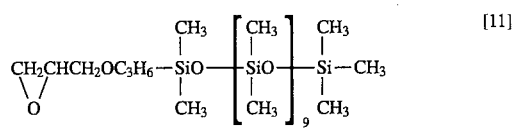

Therein, 62.0 g of methanol and 71.2 g of ethylene glycol were distilled off, and 386.9 g of a light brown translucent solid was obtained.

The weight average molecular weight was 20,000, the glass transition temperature was 66° C., the softening point was 115° C. and the hydroxyl value was 25.7 mg KOH/g.

The corresponding monomer composition was found to consist of the polycarboxylic acids having therebetween the molar ratio as shown in the following formula [12], and the polyhydric alcohols which had thereamong the molar ratio as shown in the following formula [13];

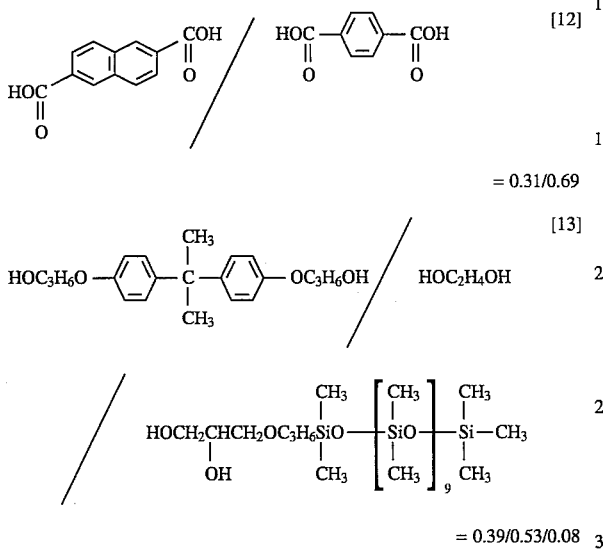

An analysis performed by atomic absorption spectrometry showed that 19.9 weight % of the polymer was dimethylpolysiloxane.

EXAMPLE 2

The same method as in Synthesis Example 2 was used, except that a dihydroxy group-containing dimethylpolysiloxane as shown by the formula 14] below was further added in an amount of 121.0 g (0.1 mole).

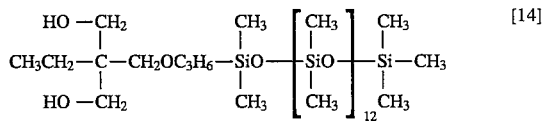

Therein, 60.8 g of methanol and 80.8 g of ethylene glycol were distilled off, and 492.7 g of a light brown translucent solid was obtained. The weight average molecular weight was 18,600, the glass transition temperature was 72° C., the softening point was 121° C. and the hydroxyl value was 26.3 mg KOH/g.

The corresponding mononer composition was found to consist of the polycarboxylic acid having the molar ratio as shown in the following formula [15] and the polyhydric alcohols having thereamong the molar ratio as shown in the following formula [16];

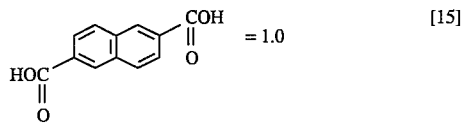

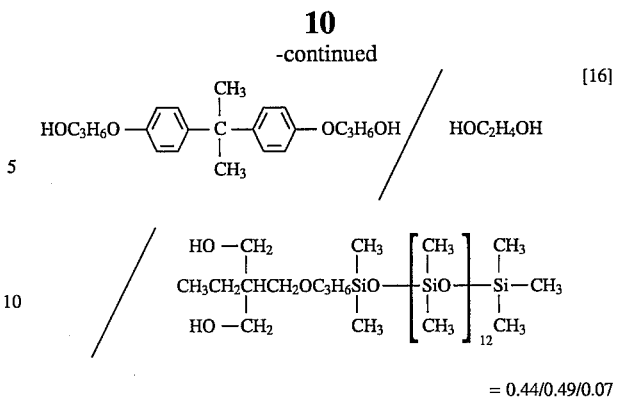

An analysis performed by atomic absorption spectrometry showed that 18.3 weight % of the polymer was dimethylpolysiloxane.

COMPARATIVE EXAMPLE 1

The same method as in Example 1 was used, except that the amount of dimethyl 2,6-naphthalenedicarboxylate was decreased to 24.4 g (0.1 mole) and the amount of dimethylterephthalate was increased to 174.6 g (0.9 mole). Therein, 63.2 g of methanol and 81.2 g of ethylene glycol were distilled off, and 372.9 g of a light brown translucent solid was obtained.

The weight average molecular weight was 17,500, the glass transition temperature was 50° C., the softening point was 104 ° C., and the hydroxyl value was 28.4 mg KOH/g.

The corresponding monomer composition was found to consist of the polycarboxylic acids having therebetween the molar ratio as shown in the following formula [17] and the polyhydric alcohols having thereamong the molar ratio as shown in the following formula [18];

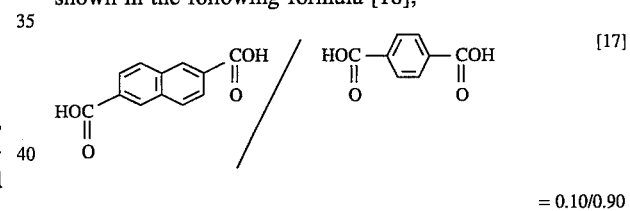

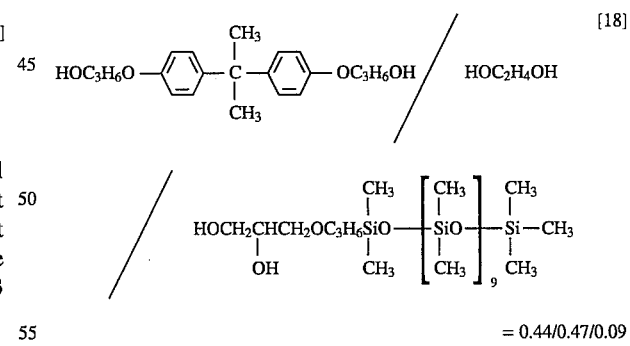

An analysis performed by atomic absorption spectrometry showed that 20.2 weight % of the polymer was dimethylpolysiloxane.

EXAMPLE 3

156.9 g of the polyester obtained in Synthesis Example 1 and 300 g of toluene were introduced in a 1 liter glass flask equipped with a stirrer, a thermometer and a condenser, and heated to 60° C. to make a solution. Next, 43.1 g of an isocyanurate group-containing dimethylpolysiloxane as illustrated by the formula [19] below and 0.2 g of dibutyltin dilaurate were added thereto, and underwent the reaction under a current of nitrogen at 70° C. for 5 hours.

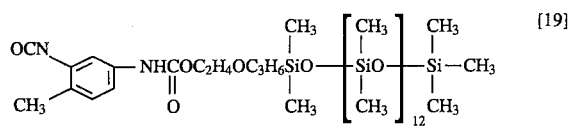

The IR spectral analysis of the reaction liquor showed that the absorption peak at 2260 cm$^{-1}$ due to —NCO, which had been observed prior to the reaction, had disappeared. The toluene solvent was stripped from the reaction liquor by distilliation, leaving 196.3 g of a light brown translucent solid.

The weight average molecular weight of this solid was 17,600, its glass transition temperature was 65° C., its softening point was 118° C. and its hydroxyl value was 10.1 mg KOH/g. The proportion of dimethylpolysiloxane as determined by atomic absorption spectrometry was found to be 16.5 weight %.

EXAMPLE 4

The same reaction as in Example 3 was performed, except that the polyester used in Example 3 was replaced by 115.5 g of the polyester of Synthesis Example 2, and the dimethylpolysiloxane containing an isocyanate group was replaced by 84.5 g of the compound represented by the following formula [20];

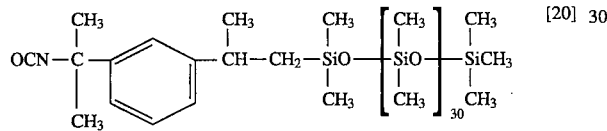

Thus, 193.1 g of a light brown translucent solid was obtained. The weight average molecular weight was 10,300, the glass transition temperature was 68° C., the softening point was 119° C. and the hydroxyl value was 9.8 mg KOH/g. The proportion of dimethylpolysiloxane was found to be 40.3 weight %.

EXAMPLES 5–8 and COMPARATIVE EXAMPLE 2

Solvents, a crosslinking agent and a crosslinking promoter as hereinafter shown in the Table 1 were blended with each of the polyester silicone copolymers obtained in Examples 1–4 and Comparative Example 1 to prepare coating compositions. Each of these coating compositions was coated on a 100μm-thick PET film, and heated for 1 minute at 100° C. to form a film having a thickness of 5 μm. The water contact angle, dynamic friction coefficient and blocking property were examined for each film according to the methods given below, and the results are shown in Table 1.

The examination results shown in Table 1 demonstrate the efficacy of this invention.

Water contact angle

5 μl of pure water was dripped onto a test panel held horizontally, and measurements were taken with a contact angle meter CA-A (Kyowa Kagaku Co. Ltd.).

Dynamic friction coefficient

Measurements were carried out with a dynamic friction meter (Kyowa Kagaku Co. Ltd.) under a condition that the friction element was a SUS Ball, the load was 50 g and the speed was 15 cm/min.

Blocking property

An untreated PET film was pressed on a film made from a coating composition according to this invention under a load of 100 g/cm$^2$, and left at 60° C. for 48 hours. The PET film was then peeled off, and blocking was examined according to the following criteria;

Satisfactory . . . The PET film was easily peeled off without damaging the coating composition film.

Unsatisfactory . . . The PET film adhered to the coating composition film, and peeling it off damaged the other film.

Peeling force

Cellophane tape (Nichiban) which had been made to adhere to the coating composition film under a load of 20 g/cm$^2$ at 60° C. for 24 hours, was peeled off at an angle of 180° and at a speed of 0.3 m/min using a tensile tester, and the peeling force was measured.

TABLE 1

|  | Example 5 | Example 6 | Example 7 | Example 8 | Comparative Example 2 |
|---|---|---|---|---|---|
| Polyester-Silicone Copolymer | Copolymer of Example 1 | Copolymer of Example 2 | Copolymer of Example 3 | Copolymer of Example 4 | Copolymer of Comparative Example 1 |
| (parts by weight) | 20 | 20 | 20 | 20 | 20 |
| Solvent (parts by weight) | | | | | |
| Toluene | 20 | 30 | 20 | 20 | 20 |
| Methyl Ethyl Ketone | 30 | 50 | | 30 | 30 |
| Ethyl Acetate | 30 | | 60 | 30 | 30 |
| Crosslinking Agent (parts by weight) | | | | | |
| Isocyanurate-bonded HDI | 2.0 | | 0.9 | 0.8 | 2.5 |
| HDI | | 1.0 | | | |
| Crosslinking Promoter (parts by weight) | | | | | |
| Dibutyltin Dilaurate | 0.05 | 0.05 | 0.05 | 0.05 | 0.05 |
| Water Contact Angle (degree) | 102 | 103 | 100 | 106 | 101 |
| Dynamic Friction Coefficient | 0.18 | 0.16 | 0.18 | 0.15 | 0.18 |
| Blocking Property | satisfactory | satisfactory | satisfactory | satisfactory | unsatisfactory |
| Peeling Force (g/inch) | 26 | 23 | 30 | 28 | 150 |

What is claimed is:

1. A polyester-silicone copolymer having a glass transition temperature of at least 60° C., comprising a polyester part containing naphthalene rings in its skeleton and a dimethylpolysiloxane part having the following structural formula II

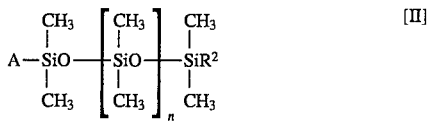

wherein n is a natural number lying in the range 3–100, $R^2$ is a monovalent hydrocarbon group having 1–4 carbon atoms and A is an organic group to which the polyester part is attached.

2. A polyester-silicone copolymer as defined in claim 1, wherein the polyester part is a polycondensation product obtained from a polycarboxylic acid and/or a derivative thereof and a polyhydric alcohol, at least 20 mole % of said polycarboxylic acid and/or derivative being a naphthalene dicarboxylic acid and/or a derivative thereof represented by the following formula [I]:

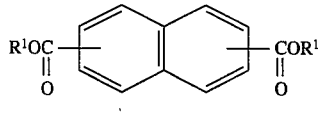

wherein $R^1$ is a hydrogen atom or a monovalent hydrocarbon group having 1–4 carbon atoms.

3. A polyester-silicone copolymer as defined in claim 1, wherein the dimethylpolysiloxane part is contained in a proportion of 3–50% by weight.

4. A polyester-silicone copolymer as defined in claim 1, wherein the polyester part has a polystyrene equivalent weight average molecular weight as determined by GPC in the range 2,000–100,000.

5. A polyester-silicone copolymer as defined in claim 2, wherein the residual mole % of the polycarboxylic acid and/or derivative thereof comprises an aromatic dicarboxylic acid other than the naphthalene dicarboxylic acid and/or a derivative thereof.

6. A coating composition containing the polyester-silicone copolymer defined in claim 1 as a main component.

7. A coating composition as defined in claim 6, further containing a solvent and a crosslinking agent.

8. A coating composition as defined in claim 7, wherein the crosslinking agent is a polyfunctional isocyanate compound.

9. A coating composition as defined in claim 8, wherein the isocyanate compound is contained in a proportion of 0.5–2.0 equivalents per one equivalent hydroxyl group of the polyester-silicone copolymer.

10. A coating composition as defined in claim 8, further containing an additional crosslinking agent.

* * * * *